United States Patent [19]

Kornblum et al.

[11] Patent Number: 5,255,940
[45] Date of Patent: Oct. 26, 1993

[54] SEAT BELT REPOSITIONING DEVICE

[76] Inventors: Brian J. Kornblum, Ossining; Paul H. Rosenthal, Yorktown Heights, both of N.Y.

[21] Appl. No.: 846,893

[22] Filed: Mar. 9, 1992

[51] Int. Cl.[5] .............................................. B60R 22/00
[52] U.S. Cl. .................................. 280/808; 280/801 R
[58] Field of Search ................ 280/801 X, 808, 80 A; 297/483, 468

[56] References Cited

U.S. PATENT DOCUMENTS

| | | | |
|---|---|---|---|
| 4,786,078 | 11/1988 | Schreier et al. | 280/808 |
| 5,042,838 | 8/1991 | Carter | 280/808 |
| 5,154,446 | 10/1992 | Blake | 280/808 |

FOREIGN PATENT DOCUMENTS 8804622  6/1988  World Int. Prop. O. .......... 280/801

Primary Examiner—Margaret A. Focarino
Assistant Examiner—Christopher P. Ellis
Attorney, Agent, or Firm—Howard S. Reiter; Bruce E. Hosmer

[57] ABSTRACT

Three-point safety belt restraint systems of the type commonly installed in passenger motor vehicles for use by the occupants can be adapted to accommodate users (i.e. wearers) including children, who may be of shorter than average stature through the incorporation of an add-on device for repositioning the shoulder restraint belt in such systems to make the restraint system adjustable to the comfort and safety of the user.

4 Claims, 1 Drawing Sheet

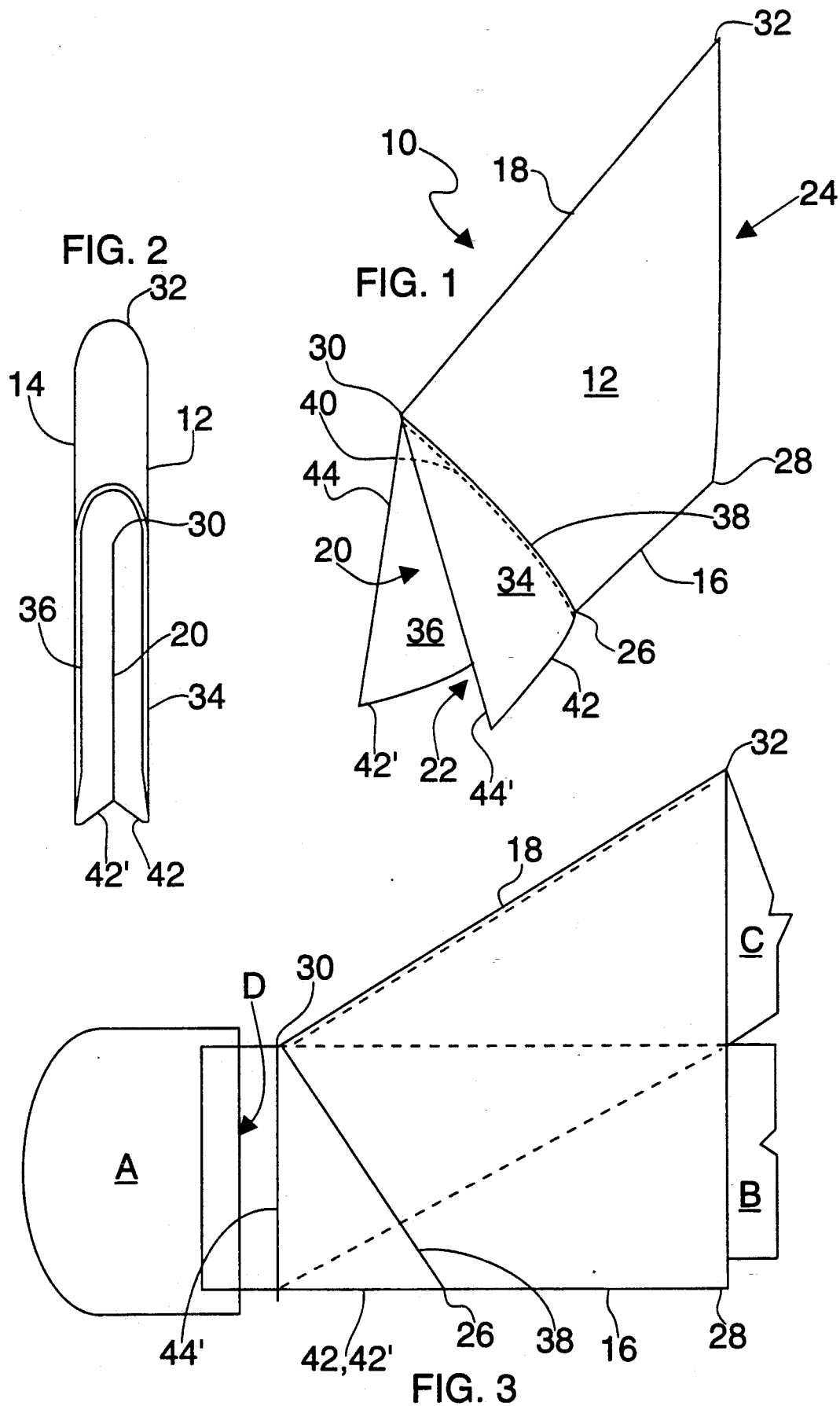

SEAT BELT REPOSITIONING DEVICE

SUMMARY OF THE INVENTION

This invention relates generally to three-point safety belt restraint systems of the type commonly installed in passenger motor vehicles for use by the occupants, and more specifically relates to a device for repositioning the shoulder restraint belt in such systems to accommodate users (i.e. wearers) including children, who may be of shorter than average stature.

BACKGROUND OF THE INVENTION

Three-point safety belt restraint systems for the protection of occupants in motor vehicles have been well-known in the automobile safety field for many years. Systems embodying a three-point anchoring arrangement are particularly well known and are generally accepted as a standard form of safety restraint; such systems generally include a lap belt portion which is anchored near the floor of the vehicle at two points on opposite sides of and slightly to the rear of the lap of a seated occupant, and a shoulder belt which is anchored at one end on one side of a seated passenger, near the roof of the vehicle at or slightly above shoulder height for an average height passenger, and is anchored at the other end to one end of the lap belt, on the other side of the passenger.

Accordingly, three-point anchor systems embody a first independent anchor point for one end of the lap belt, a second independent anchor point for one end of the shoulder belt, and a third anchor point that is common to the other end of the lap belt and the other end of the shoulder belt. In general, the independent anchor point for the one end of the shoulder belt is fixed to the frame of the vehicle at a height above the floor which represents a compromise based upon the position that is comfortable and effective for the average sized occupant.

The shoulder belt is designed to extend from the common anchor point near the floor on one side of an occupant-wearer, across the wearer's chest to the shoulder-height independent anchor point on the other side of the wearer. The lap belt extends from the same common anchor point, across the wearer's lap, along the intersection defined by the wearer's upper thighs and lower abdomen, to the independent anchor point near the floor on the opposite side of the wearer.

Because the independent anchor point for the shoulder belt is generally fixed at a height that is comfortable and effective for a wearer of average height, it is frequently uncomfortable and or ineffective for wearers of less than average height. Although wearers of greater than average height may find such shoulder belts slightly inconvenient to use, they do not suffer the specific and possible extreme discomfort to which wearers of significantly less than average height are exposed. The problem faced by wearers of less than average height is that the fixed independent anchor point tends to be well above the wearer's shoulder, such that the shoulder belt does not pass diagonally across the wearer's chest from the area of one hip to the opposite shoulder, but rather tends to rise more steeply along the chest so that it passes uncomfortably close to the chin and or ear before it reaches the independent anchor point. For wearers of exceptionally short stature such as young children, the shoulder belt in a conventional safety restraint system may well rise directly across the child's face, rendering the system so uncomfortable that it may be deliberately ignored or unused.

It has been recognized that there is a need to avoid both the discomfort of such situations and the undesirable consequences of deliberate non-use of safety restraint systems.

One approach to avoiding the discomfort of improperly positioned shoulder belts for short wearers is to provide a movable independent anchor point for the upper end of the shoulder belt; this permits the height of the anchor point to be adjusted upward or downward to correspond to the actual shoulder height of the wearer. Although such systems are being developed currently, and are believed to be effective, they are known to be complex and expensive to manufacture and to use.

OBJECTS OF THE INVENTION

Accordingly, it is an object of this invention to provide a device that repositions the shoulder belt of a three-point safety belt restraint system so that it crosses the chest of relatively short passenger/wearers along a path that comfortably holds the belt at a comfortable distance from the wearer's face and neck during ordinary use.

It is a further object of this invention to provide a repositioning device for the shoulder belt of a three-point system that is easy to install and to remove and that does not permanently alter or affect the normal functioning of the system.

Another object of this invention is to provide a repositioning device that is simple and easy to use without requiring undue manipulation or control of small parts.

And still another object of this invention to provide a shoulder belt repositioning device that is low in cost, has a minimum number of parts, and is simple and inexpensive to manufacture.

These and other and further objects features and advantages of this invention will be made apparent to those having ordinary skill in this art by reference to the following specification and the accompanying drawings, in which:

BRIEF DESCRIPTION OF DRAWINGS

FIG. 1 is a pictorial representation of one embodiment of a shoulder belt repositioning device in accordance with this invention, with two wing portions displaced from their normal position for pictorial clarity;

FIG. 2 is an end elevation view of the repositioning device of FIG. 1; and

FIG. 3 is a side elevation view of the repositioning device of FIG. 1, showing a portion of a seat belt assembly in inserted position as it would interact with the repositioning device in actual use.

DETAILED DESCRIPTION OF THE INVENTION

Referring now more particularly to the drawings, the illustrated embodiment of a seat belt positioner 10 in accordance with this invention may be seen to comprise a pair of sidewall elements 12, 14 joined together along a pair of spaced apart edges 16, 18. The sidewalls, 12, 14 and the spaced-apart edges 16, 18 together define a passageway 20 extending between the sidewalls and terminating in a pair of open ends 22, 24.

The open ends 22, 24 may be seen to extend between the opposite ends 26, 28, and 30, 32 of the edges 16, 18 respectively. Accordingly, the maximum dimension of open end 22 is measured between end 26 of edge 16 and end 30 of edge 18. Similarly, the dimension of open end 24 is measured between ends 28 and 32 of edges 16 and 18, respectively.

The overall shape of this preferred embodiment of the invention is seen to represent a form of truncated right triangle, in which open end 24 corresponds generally to one leg of the right angle, while edge 16 represents the other leg. In this context, it will be apparent that edge 18 accordingly represents the hypotenuse of the triangle, while open end 22 represents the truncated portion. It can be seen readily that the triangular form has been truncated at an oblique angle to edge 16, so that the dimension of open end 22 measured along a line extending between the ends 26 and 30 is greater than the "projected" dimension of opening 22 measured between end 30 and a linear extension of edge 16, measured along a line extending substantially perpendicular to said linear extension.

In the preferred form illustrated in the accompanying drawings, and shown most clearly in FIG. 1, open end 22 is flanked by a pair of flap members 34, 36 that are mounted to the sidewalls 12, 14 by integrally formed hinges 38, 40 (shown in dotted line representation substantially parallel to hinge 38, in FIG. 1). In each one of sidewalls 12, 14, the hinges 38, 40 extend along a linear pivot line from end 26 of edge 16 to end 30 of edge 18. It can be seen readily that the pivot lines of the hinges correspond generally to the defining edge of open end 22. The shape of flaps 34, 36 is such that the free edges 42, 44 and 42', 44' are substantially aligned, respectively, with the axis of edge 16 and with a line perpendicular to the axis of edge 16. Although the flaps 34, 36 are shown spread apart, for clarity of illustration, in FIG. 1, it should be understood that, in actual use, the flaps will be biased together in parallel, closely abutting relationship, as explained below and as shown in FIG. 2.

In operation, the material from which the sidewalls 12, 14 and the flaps 34, 36 are formed integrally, is such that flaps 34, 36 are normally biased into coplanar alignment with the generally planar structure of the sidewalls 12, 14. Accordingly, when a device such as the latching buckle A coupled in common to the ends of a lap belt B and a shoulder belt C is inserted into the open end 24 through passageway 20 and out through open end 22 past the flaps 34, 36, the biasing action of the integral pivot lines acts to urge the flaps toward abutting relationship with each other so as to engage the opposite sides of the seat belts disposed between them. When, as is usual, the thickness of the belt disposed between the flaps is significantly less than the thickness of the buckle that is passed between them, the perpendicularly positioned free edges 44 and 44' of flaps 34, 36 abut the normally facing wider end D of the buckle A, to inhibit withdrawal of the buckle past the flaps and into the passageway 20.

The perpendicular edges 44 and 44' of flaps 34, 36 perform a significant function in this embodiment. Specifically, it is well known that in standard form three-point seat belt assemblies, the rearward edge of the buckle member, corresponding to end D illustrated in FIG. 3, is oriented substantially perpendicularly to the elongate edges of the lap belt. Correspondingly, it is equally well-known and conventional for the buckle to be skewed at an angle to the parallel elongate edges of the shoulder belt. The described configuration of flaps 34, 36 take advantage of this conventional configuration so that in actual use, when the lower elongate edge of the lap belt is urged into parallel, elongate engagement with the edge 16 within the passageway 20, and the upper elongate edge of the shoulder belt is urged into similar engagement with the inner side of edge 18 within the passageway 20, the rearward edge D of the buckle A is urged firmly and squarely into parallel abutting relationship with the edges 44 and 44' of flaps 34, 36. Accordingly, the shape of the flaps 34, 36 and the biasing action of the integral pivot lines of hinges 38, 40 act in novel concert to resist reentry of the buckle A into passageway 20 through open end 22. As a result of this structure, the seat belt positioner 10 is retained on the seat belt assembly in proper location for effective performance of its intended function in accordance with this invention. And in particular, because the length of edges 44, 44' is less than the dimensional length of opening 22 between points 26 and 30, these relative dimensions may be chosen so that the length of rearward edge D of a representative buckle A is greater than edges 44, 44', so as to further inhibit reentry of the buckle into passageway 20. In normal use, or under the forces imposed during an emergency, the angle formed by the intersection of the lap belt and the shoulder belt will tend to increase, thereby tending to retract the buckle D into the closed end 22, as the belts B and C are drawn apart against the restraint imposed by open end 24. Under non-emergency conditions, the structure of the body 12 of positioner 10 will provide sufficient stiffness to prevent reentry of a buckle, D into open end 22, past the "obstacle" represented by flaps 34, 36. Preferably, one end of edge D may abut against point 30 at the start of open end 22. Under emergency conditions, when the forces acting on belts B and C are substantially increased, the stiffness of body 12 will be overcome so as to draw the buckle D forcibly into opening 22 by displacing flaps 34, 36 to non-interfering position, or by partially collapsing the body 12 along its length between ends 22 and 24, until open end 24 reaches a position relative to belts B and C where it does not represent a restraint on the positioning of the belts relative to each other.

It should be understood within the level of ordinary skill in this art, that the positioner 10 may be fabricated from a variety of acceptable materials, and in a variety of suitable dimensions and relative proportions. A preferable positioner has been constructed in accordance with this invention using a composite of four layers having a decorative upholstery fabric of synthetic fiber as the outer layer, a first intermediate layer beneath the outer layer comprising a soft foam material such as a ½ inch thickness of urethane foam or polyurethane foam to provide desirable "bulk" and padding effect, a second intermediate (e.g. an "interface") layer of nonwoven fabric made up of the following well-known materials in the indicated proportions, to provide a desired level of stiffness and structural integrity in accordance with the description set forth herein: 50% Nylon, 30% Rayon and 20% acetate, and an inner surface layer of molded gripper material having at least one surface characterized by small projecting "nubs", including but not limited to vinyl dots, arrayed in a continuous grid-like pattern; such a material is marketed commercially under the name "Jiffy Grip Fabric."

The gripping effect of the inner layer serves the desirable purpose of engaging the surface of inserted seat belts to retain the positioner in any selected position along the length of the belts. This effect is enhanced by the stiffness of the preferable structure herein described, which urges the opposed surfaces of the inner layer toward each other to provide a gripping force in the nature of a pincer. Proper selection of the decorative outer fabric layer may further enhance the desirable retention of the positioner in a selected position relative to a user. Specifically, a rough-textured fabric of a non-slippery fiber or non-woven material such as is commonly used for automobile seat upholstery, will frictionally engage the clothing or other exposed surface of a wearer to inhibit unintended displacement of the positioner while it is being worn by a user.

The layers may be secured together simply by stitching along the common edges; however, in a preferable embodiment, it has been discovered that the inner layer of "Jiffy Grip" material may be adhered over all or substantially all of its surface area to the abutting surface of the second intermediate layer of non woven material by application of heat and pressure in any well known manner. This form of fabrication has been found to provide a superior body structure characterized by increased rigidity accompanied by satisfactory flexibility for the purposes herein described.

The positioner 10 may be fabricated from one piece of such a composite material, cut in a suitable flat pattern in any well-known manner, reversely folded on itself along edge 18 and stitched together in any suitable manner along edge 16. It will be recognized readily that this construction may be reversed if desired, with the fabric being folded along edge 16 and stitched along edge 18, without in any way departing from the scope of this invention. Although it is deemed preferable for the secured edge 16 or 18 to be stitched or otherwise permanently secured together, it will be further recognized that the attached edge, either 16 or 18, may be made separable if desired, to provide access to the interior for cleaning purposes for example. If the edge 16 or 18 is made separable, the walls 12, 14 may be fastened together along the edge using a zipper or one or more snap fasteners or any other suitable fastener of well-known design that will provide adequate resistance to inadvertent separation in response to the forces generated by inserted seat belts under ordinary conditions of use.

The integral flaps 34, 36 may be provided, if desired, by cutting a pattern in a suitable shape and stitching the edge 16 in a suitable length so that the edges 42 and 42' of the flap portions are allowed to remain free of each other. The pivot line of the hinges 38 and 40 will form naturally by termination of the edges 16 and 18 at the indicated points. However, it should be understood that the hinges may be further defined if desired by weakening the composite fabric of the sidewalls 12, 14, as by deforming it through application of heat and pressure in any well-known manner, to form a permanently compressed area that will "crease" or "fold" more readily than the surrounding portions of the sidewalls.

Although three-point seat belt assemblies are commonly constructed in a variety of different dimensions and proportions, the variety is generally confined within a relatively narrow range, so that the positioner may be constructed with a "compromise" set of dimensions that will allow it to operate effectively with a wide range if not a majority of existing and proposed seat belt assemblies. It will be understood readily within the context of ordinary manufacturing and marketing knowledge, that two or more sizes of positioners, each representing a different set of "compromise" dimensions, may be provided to accommodate among them all actual or reasonably anticipated sizes of seat belt assemblies, without departing from the spirit or scope off this invention. In a representative "compromise" size, the repositioner device of this invention, the maximum dimension of open end 24 is 7½", the length of edge 44 of flap 34 is 2¼" to 2½", the length of edge 18, connecting the upper corners of open ends 22, 24 is 9", while the length of the stitched edge 16 is 4", and the length of the free edges 42, 42' of flaps 34, 36 is 3".

Although a specific embodiment of this invention has been disclosed, it should be understood that various other and different forms and embodiments are possible within the scope of this disclosure and the following claims.

What is claimed is:

1. A shoulder belt repositioning device for use with a three-point vehicular safety belt system, comprising:
    a pair of substantially planar sidewalls disposed in side by side relationship defining an elongate passageway between them;
    said passageway extending from a first open end to a second open end spaced from said first open end;
    said sidewalls being joined to each other along first and second spaced apart edges, said edges extending from said first open end to said second open end, on opposite sides of said passageway;
    the dimension of said second open end, corresponding to the distance between the second ends of said first and second edges, measured in a direction substantially perpendicular to said first edge, being substantially greater than the dimension of said first open end, wherein the dimension of said first open end corresponds to the distance between the first ends of said first and second edges, and said dimension of said first open end is greater than the perpendicular distance between the first end of said second edge and the longitudinal axis of said first edge.

2. The shoulder belt positioning device of claim 1, wherein:
    each sidewall further includes a flap portion attached to said sidewall adjacent to said first open end by means of an integral hinge formed along a line extending between the first ends of said first and second edges;
    at least one of said flap portions being generally triangular in shape and having a free edge thereof positioned substantially perpendicular to the longitudinal axis of said first edge of said sidewall; and
    said integral hinges resiliently bias said flap portions into generally coplanar alignment with the corresponding sidewall.

3. The shoulder belt positioning device of claim 1, wherein:
    each sidewall has an inner surface and an outer surface, and the said inner surfaces lie in substantially abutting, resiliently separable relationship, such that a portion of a seat belt system having a given thickness may be passed through said passageway, entering through said second open end and exiting through said first open end to leave another portion of said system having a thickness less than said given thickness remaining within said passageway and in engagement with said resiliently abutting inner surfaces.

4. A shoulder belt positioning device for use with a three-point vehicular safety belt system, comprising:

a pair of substantially planar sidewalls disposed in side by side relationship defining an elongate passageway between them for receiving a seat belt latching member having a lap belt and a shoulder belt attached thereto;

said passageway extending from a first open end to a second open end spaced from said first open end;

said sidewalls being joined to each other along a first edge for linearly engaging a portion of one elongate edge of a lap belt received in said passageway and along a second edge for linearly engaging a portion of one elongate edge of a shoulder belt received in said passageway, said edges extending from said first open end to said second open end, on opposite sides of said passageway;

the dimension of said second open end, corresponding to the distance between the second ends of said first and second edges, measured in a direction substantially perpendicular to said first edge, being substantially greater than the dimension of said first open end, wherein the dimension of said first open end corresponds to the distance between the first ends of said first and second edges, and said dimension of said first open end is greater than the perpendicular distance between the first end of said second edge and the longitudinal axis of said first edge;

wherein the dimension of said first open end is selected relative to said given dimension of seat belt latching member so as to permit passage of said latching member through said first open end, and the perpendicular distance between the first end of said second edge and the longitudinal axis of said first edge is less than said given dimension so as to inhibit withdrawal of said latching member back through said first open end into said passageway in a direction generally parallel to said first edge.

* * * * *